Figure 1:
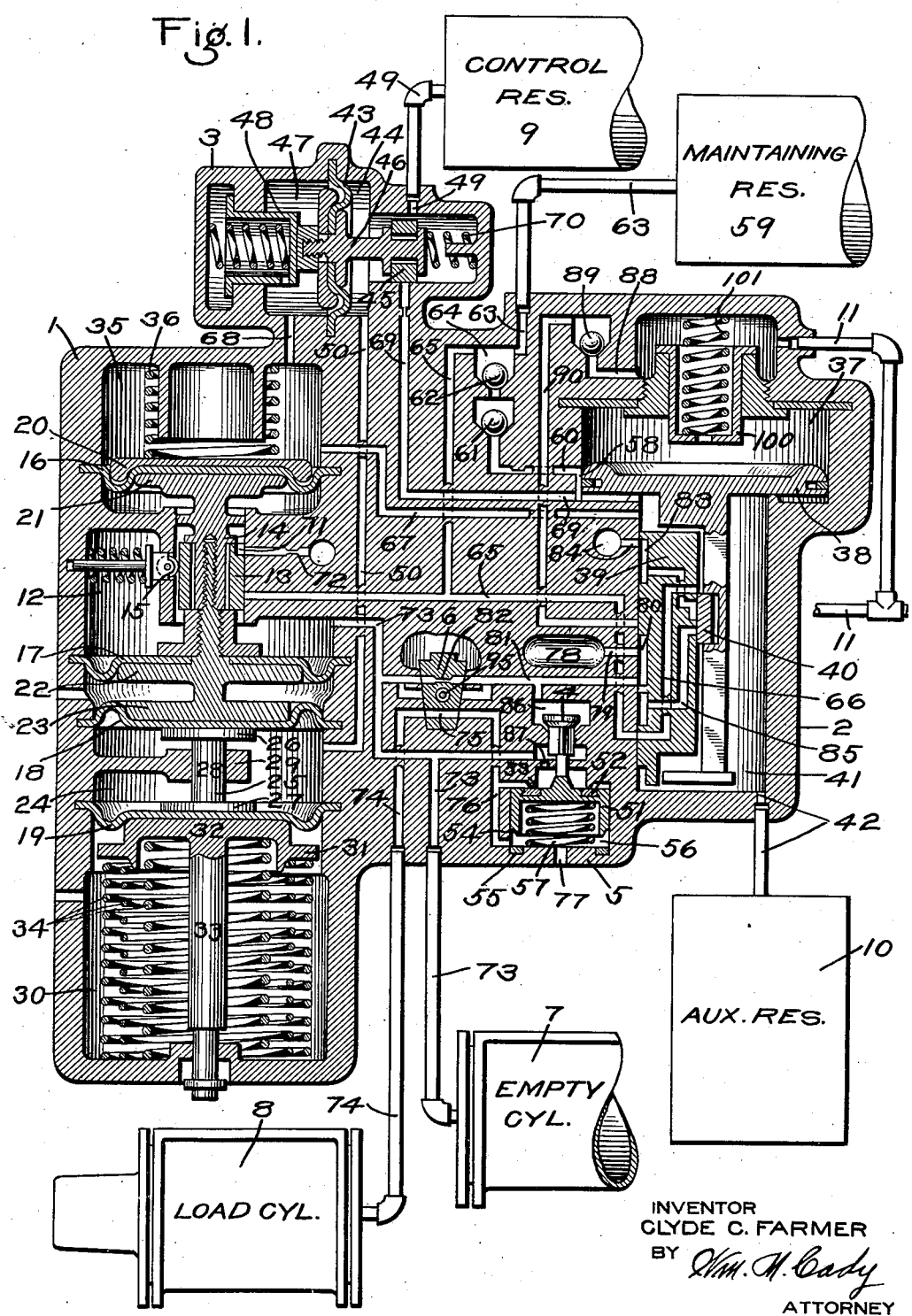

Aug. 18, 1931.  C. C. FARMER  1,819,505
FLUID PRESSURE BRAKE
Filed March 12, 1929  2 Sheets-Sheet 1

INVENTOR
CLYDE C. FARMER
BY Wm. M. Cady
ATTORNEY

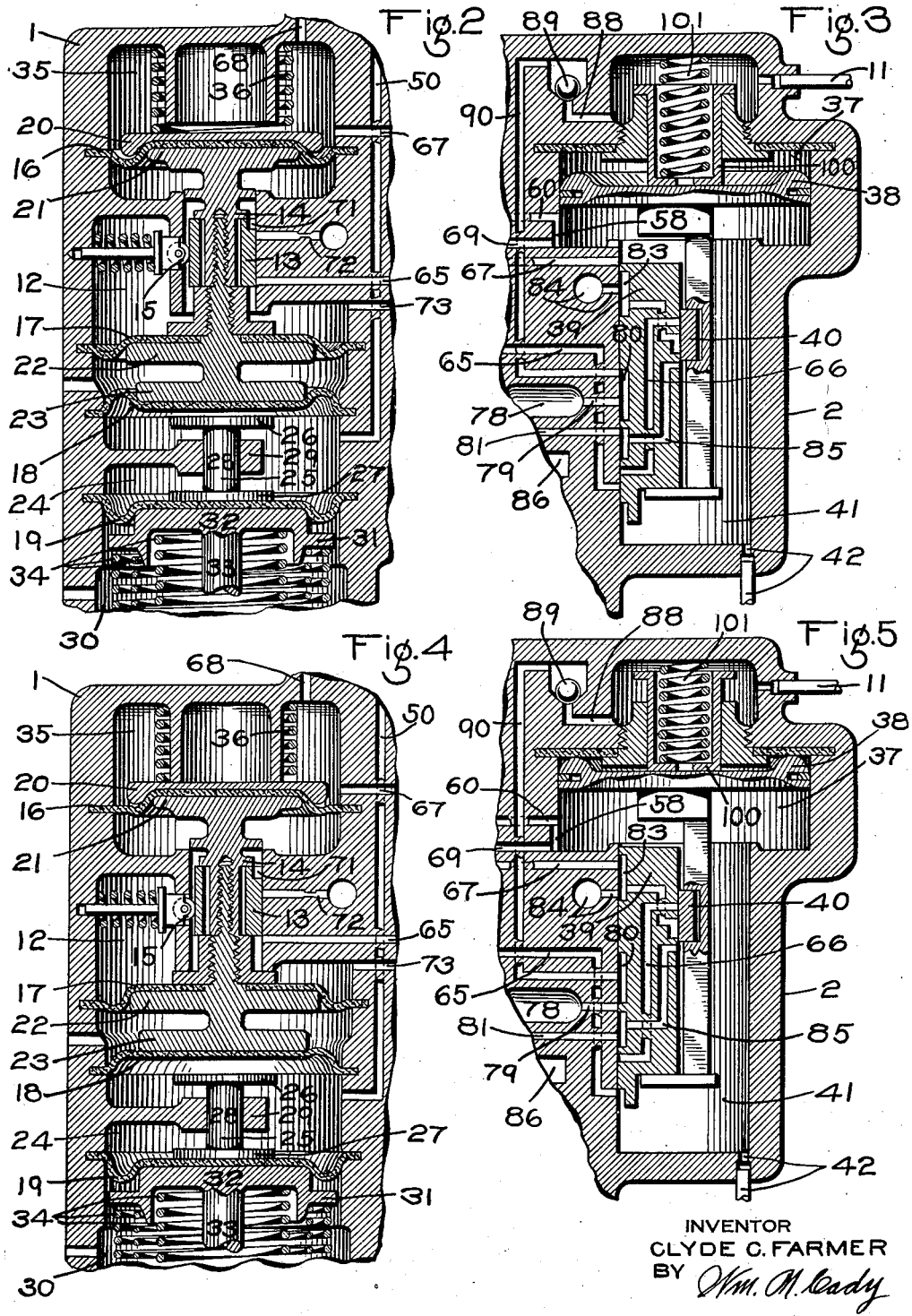
Aug. 18, 1931. C. C. FARMER 1,819,505
FLUID PRESSURE BRAKE
Filed March 12, 1929 2 Sheets-Sheet 2
INVENTOR
CLYDE C. FARMER
BY Wm. M. Cady
ATTORNEY Patented Aug. 18, 1931

1,819,505

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 12, 1929. Serial No. 346,293.

This invention relates to fluid pressure brakes and has for its principal object the provision of improved valve means for controlling the application and release of the brakes.

Another object of my invention is to provide a fluid pressure brake equipment in which a predetermined brake cylinder pressure will be automatically maintained regardless of leakage of fluid under pressure from the equipment.

A further object of my invention is to provide an improved empty and load brake equipment.

Other objects and advantages will appear in the following more detailed description of my invention.

In the accompanying drawings, Fig. 1 is a diagrammatic view of a fluid pressure brake equipment embodying my invention, the equipment being shown in release position; Figs. 2 and 3 are fragmentary sectional views showing the control valve device and the triple valve device, respectively, in service position; and Figs. 4 and 5 are like views showing the control valve device and triple valve device, respectively, in emergency position.

According to my invention, the brake equipment may comprise a control valve device 1, a triple valve device 2, a charging valve device 3, a quick inshot valve 4, a load cylinder cut-in valve device 5, an empty and load change-over valve 6, an empty brake cylinder 7, a load brake cylinder 8, a control reservoir 9, an auxiliary reservoir 10 and a brake pipe 11.

Fig. 1 of the drawings of the present embodiment of the invention, the pistons and piston rods of the empty and load brake cylinders, and the mechanism connecting the piston rods, have not been shown since they, in themselves, form no part of this invention. However, it is to be understood that there will be a mechanism employed which will permit the piston and piston rod of the empty brake cylinder 7 to move outwardly in applying the brakes without causing the outward movement of the piston of the load brake cylinder 8. For this purpose, a mechanism may be employed which is of the same general character as that shown and described in United States Letters Patent No. 1,125,215, issued January 19, 1915 in the name of Walter V. Turner for Empty and load brake apparatus.

The control valve device 1 may comprise a casing having a valve chamber 12 containing a control slide valve 13 which is carried by a stem 14 and is held to its seat by a spring pressed roller 15 and which is adapted to be operated by spaced flexible diaphragms 16, 17, 18 and 19 secured in the casing, the areas of the diaphragms 16, 18 and 19 being substantially equal to each other and the area of the diaphragm 17 being greater than that of either of the diaphragms 16, 18 and 19.

The flexible diaphragm 16 is clamped between one side of a follower plate 20 and a follower head 21 formed on the upper end of the stem 14. The lower end of the stem is provided with a follower portion having spaced portions 22 and 23, the diaphragm 17 being secured to the portion 22 and the diaphragm 18 being adapted to engage the under side of the portion 23.

Contained in a diaphragm chamber 24, is a follower member 25 having spaced top and bottom follower heads 26 and 27 respectively, which are connected by a stem 28, slidably guided in a bracket 29 preferably integral with the casing. The follower head 26 is adapted to engage the underside of the diaphragm 18 and the follower head 27 engages the upper side of the diaphragm 19.

Contained in a chamber 30 at one side of the flexible diaphragm 19 is a follower member 31 having a head portion 32 engaging the under side of the diaphragm 19 and also having a stem 33 which is slidably guided in the casing. This follower is subject to the pressure of springs 34 which are interposed between the head portion 32 and the casing.

A chamber 35, at the upper side of the flexible diaphragm 16, contains a spring 36 which is interposed between the casing and the follower plate 20.

The triple valve device 2 may comprise a casing having a piston chamber 37 connected to the brake pipe 11 and containing a piston 38 and a piston stop 100 which is subject to the pressure of a spring 101, and further comprises a main slide valve 39 and an auxiliary slide valve 40 operable by the piston 38 and contained in a valve chamber 41 which is connected to the auxiliary reservoir 10 by way of pipe and passage 42.

The charging valve device 3 comprises a casing in which there is secured a flexible diaphragm 43, the chamber 44 at one side of the diaphragm containing a slide valve 45 which is adapted to be operated by a stem 46 secured at one end to the diaphragm 43. Contained in a chamber 47 at the other side of the diaphragm 43 is a spring pressed stop 48 with which one end of the stem 46 is adapted to engage to control the operation of the slide valve 45 as will hereinafter more fully appear.

The valve chamber 44 of the charging valve device 3 is constantly connected to the control reservoir 9 through a pipe and passage 49 and is constantly connected to the diaphragm chamber 24 of the control valve device 1, through a passage 50.

The load cylinder cut-in valve device 5 may comprise a casing containing a valve piston 51 having a valve 52 adapted to seal against seat ring 53 and having a valve 54 adapted to seal against an annular washer 55 mounted in the casing. Contained in a chamber 56 at one side of the valve piston, is a spring 57, the pressure of which is adapted to maintain the valve 52 normally seated against the seat ring 53. The valve piston is provided with a centrally arranged projection which is adapted to engage the lower end of the stem portion of the inshot valve 4.

In initially charging the equipment, fluid under pressure supplied to the brake pipe 11 flows to the triple valve piston chamber 37, causing the piston 38 and slide valves 39 and 40 to move downwardly to their release positions as shown in Fig. 1 of the drawings, in which fluid under pressure is supplied to the auxiliary reservoir through a feed groove 58, slide valve chamber 41 and passage and pipe 42.

With the piston 38 of the triple valve device in release position, fluid under pressure is supplied to a maintaining reservoir 59 through a restricted passage 60, past ball check valves 61 and 62 and through a passage and pipe 63. With the slide valves 39 and 40 in release positions, the maintaining reservoir is in communication with the auxiliary reservoir 10 through pipe and passage 63, chamber 64 containing the ball check valve 62, passage 65, port 66 in the main slide valve 39 of the triple valve device, slide valve chamber 41 and passage and pipe 42.

From the valve chamber 41 of the triple valve device, fluid under pressure is supplied to the diaphragm chamber 35 of the control valve device 1 through a passage 67, and fluid under pressure thus supplied to the chamber 35 flows to the chamber 47 of the charging valve device 3 through a passage 68.

When fluid under pressure is supplied to the chamber 47, the diaphragm 43 is caused to operate to shift the stem 46 and slide valve 45 toward the right hand, uncovering a restricted passage 69. Fluid under pressure now flows from the valve chamber 41 of the triple valve device to the control reservoir 9 through the passage 69, valve chamber 44 in the charging valve device 3 and passage and pipe 49.

From the valve chamber 44 in the device 3, fluid under pressure flows to the diaphragm chamber 24 of the control valve device through the passage 50.

Now, when the pressure of fluid in the diaphragm chambers 44 and 47, in the charging valve device, are substantially equal, the pressure of a spring 70, which has been compressed during the movement of the stem 46 to its right hand position, returns the stem 46, diaphragm 43 and valve 45 to their normal positions in which the slide valve 45 laps the passage 69.

The pressure of fluid supplied to the diaphragm chamber 24 of the control valve device and acting on the flexible diaphragm 19, causes said diaphragm to operate to move the follower member 31 downwardly against the pressure of the springs 34. When the diaphragm 19 thus operates, the follower member 25 moves downwardly with it under the influence of gravity.

When the pressure of fluid in the diaphragm chamber 35, acting on the diaphragm 16, and pressure of fluid in the diaphragm chamber 24, acting on the diaphragm 18, are substantially equal, the pressure of the spring 36 will cause the diaphragms 16, 17 and 18, stem 14 and control slide valve 13 to move to their release positions as shown in Fig. 1 of the drawings in which position the passage 65 leading to the seat of the slide valve will be lapped and the valve chamber 12 connected to atmosphere through a cavity 71 in the slide valve 13 and a restricted atmospheric passage 72.

With the triple valve device and control valve device in release positions, the empty brake cylinder 7 is connected to atmosphere by way of a pipe and passage 73, valve chamber 12 in the control valve device, cavity 71 in the slide valve 13 and passage 72, and the load brake cylinder 8 is connected to atmosphere through pipe and passage 74, a passage 75 in the empty and load change-over valve 6, a passage 76, past the unseated valve 54 of the valve piston 51, through chamber 56 and an atmospheric passage 77. A quick service chamber 78 is also connected to atmosphere through a passage 79, a cavity 80 in the main slide valve 39 of the triple valve device, a passage 81, a restricted passage 82 in the change-over valve 6 and passage 73.

Should the control reservoir become overcharged with fluid under pressure, due to the usual brake valve device (not shown) being maintained in release position for too long a time, the pressure of fluid in this reservoir may be reduced by effecting an emergency reduction in brake pipe pressure. Upon the effecting of such a reduction, the triple valve device operates to emergency position in which the chamber 47, in the charging valve device 3, is vented to atmosphere by way of passage 68, chamber 35 in the control valve device, passage 67, a cavity 83 in the main slide valve 39 of the triple valve device and atmospheric passage 84. With the chamber 47 thus vented, fluid under pressure in the chamber 44, acting on one side of the diaphragm 43, causes the diaphragm to operate to shift the stem 46 and the slide valve 45 toward the right hand against the pressure of the stop 48, uncovering the passage 69, so that the pressure of fluid in the control reservoir and chamber 44 will reduce into the auxiliary reservoir 10 by way of passage 69, valve chamber 41 in the triple valve device and passage and pipe 42. Now, when the brake valve device is operated to release position, the triple valve device will be caused to move to release position in which the connection of the chamber 47 to the atmosphere is closed off and the connection of the chamber 47 with the valve chamber 41 in the triple valve device is again established and when the pressures of fluid in the chambers 47 and 44 are substantially equal, the pressure of the spring pressed to stop 48 causes the diaphragm 43 and stem 46 to operate to shift the slide valve 45 to its normal position as shown in the drawings, in which position, the flow of fluid under pressure through the passage 69 is closed off.

From the foregoing it will be seen that the equipment is fully charged and is in the normal release position, in which the empty brake cylinder 7 and load brake cylinder 8 are both vented to atmosphere.

A service application of the brakes is effected by making a gradual reduction in the pressure of fluid in the brake pipe 11 in the usual manner and consequently in the piston chamber 37 in the triple valve device 2. Fluid under pressure in the valve chamber 41, acting on the under side of the piston 38, now causes it to operate to shift the auxiliary slide valve 40 and main slide valve 41 to their service positions as shown in Fig. 3, in which fluid under pressure from the auxiliary reservoir 10 and connected valve chamber 41, is supplied to the empty brake cylinder 7 through a port 85 in the main slide valve 39, which has been uncovered by the auxiliary slide valve 40 during its initial movement relative to the slide valve 39, the passage 81, a valve chamber 86 containing the quick inshot valve 4, past the unseated valve 4 and the fluted portion of its stem and then through passage and pipe 73.

Fluid under pressure from the passage 73 also flows to the inner seated area of the valve 52 of the load cut-in valve device 5, by way of a restricted passage 87. When the pressure of fluid acting on this area builds up to a predetermined degree, the valve piston 51 is forced downwardly against the pressure of the spring 57, unseating the valve 52 and seating the valve 54. When the valve piston 51 moves downwardly, the quick inshot valve 4 moves with it and seats, closing off the flow of fluid under pressure from the valve chamber 86 to the passage 73.

With the quick inshot valve 4 thus seated, fluid under pressure flows from the passage 81 to the empty brake cylinder 7 by way of the restricted passage 82 in the change-over valve 6 and passage and pipe 73. From the passage 73 fluid under pressure flows to the load brake cylinder 8 through the passage 87, past the unseated valve 52, passage 76, passage 75 in the change-over valve 6 and passage and pipe 74. When the valve 54 seats, communication of the passage 76 with atmosphere, by way of chamber 56 and passage 77 is closed off, so that there will be no loss of fluid under pressure from the brake cylinders.

With the triple valve device in service position as shown in Fig. 3, the cavity 80 of the main slide valve connects the brake pipe 11 to the quick service chamber 78 by way of the piston chamber 37 in the triple valve device, a passage 88, past a ball check valve 89, a passage 90, cavity 80 in the slide valve 39 of the triple valve device and passage 79. Fluid under pressure thus vented from the brake pipe causes a local reduction in brake pipe pressure, and the well known quick serial action throughout the train.

Since the diaphragm chamber 35 of the control valve device is connected to the valve chamber 41 of the triple valve device, by way of passage 67, when the triple valve device is in service position, the pressure of fluid in the chamber 35 will reduce with the pressure of fluid in the auxiliary reservoir 10. When the pressure of fluid in chamber 35 is thus reduced, the pressure of fluid in the chamber 24, acting on the diaphragm 18, causes the stem 14 and valve 13 of the control valve device to move upwardly until such time as the pressure of fluid supplied to the chamber 12 of the control valve device, by way of passage 73, is sufficient to balance the forces acting upon the diaphragms, at which time, the upward movement of the slide valve 13 will be stopped in its middle or lap position as shown in Fig. 2. With the slide valve 13 in lap position, the atmospheric passage 72 is lapped, so that there will be no flow of fluid under pressure from the chamber 12 to atmosphere. The passage 65 leading to the slide valve seat of the control valve device is also lapped.

If, in effecting an application of the brakes, it is desired to limit the brake cylinder pressure, the usual brake valve device is operated to lap position and when the pressure of fluid in the piston chamber 37 of the triple valve device becomes slightly greater than the pressure of fluid in the valve chamber 41, the piston 38 will operate to shift the auxiliary slide valve 40 to service lap position, in which the valve 40 laps the port 85 in the main slide valve 39, thus closing off the further supply of fluid under pressure from the valve chamber 41 to the brake cylinders.

To release the brakes after a service application, the pressure of fluid in the brake pipe 11 is increased in the usual manner, causing the triple valve device 2 to be moved to release position, in which the auxiliary reservoir and chamber 35 of the control valve device 1 are recharged. The recharging of the chamber 35 causes the control valve device to be unbalanced so that the pressure of fluid in this chamber, acting on the diaphragm 16, will cause the slide valve 13 to be moved to release position, in which the brake cylinders are vented to atmosphere by way of pipe and passage 73, diaphragm chamber 12 of the control valve device, cavity 71 in the slide valve 13 and restricted atmospheric passage 72.

When the brake cylinder pressure has thus been reduced to a predetermined degree, the pressure of the spring 57 will cause the valve piston 51 to move upwardly and seat the valve 52 against the seat ring 52. As the valve piston is thus moved, the valve 54 will unseat so that the remaining fluid under pressure in the load cylinder 8 flows to atmosphere by way of pipe and passage 74, passage 75 in the change-over valve 6, passage 76, chamber 56 and atmospheric passage 77. It will be noted that fluid under pressure from the empty brake cylinder 7 continues to flow to atmosphere by way of pipe and passage 73, chamber 12, cavity 71 in the slide valve 13 and atmospheric passage 72.

To effect a graduated release of the brakes, the pressure of fluid in the brake pipe 11 is increased in the usual manner, causing the triple valve device 2 to be moved to release position, in which the auxiliary reservoir is supplied with fluid under pressure by way of the feed groove 58 past the triple valve piston 38, valve chamber 41 and passage and pipe 42. With the main slide valve 39 of the triple valve device thus returned to release position, the auxiliary reservoir is further supplied with fluid under pressure from the maintaining reservoir 59 by way of pipe and passage 63, check valve chamber 64, passage 65, port 66 in the main slide valve 39 of the triple valve device and valve chamber 41. A quick recharge of the auxiliary reservoir is thus effected.

With the main slide valve 39 in release position, fluid under pressure is again supplied from the valve chamber 41 to the chamber 35 of the control valve device by way of passage 67, and when the pressure of fluid in this latter chamber, acting on the diaphragm 16, is sufficient to unbalance the control valve device, said device will operate to release position, in which fluid under pressure from the brake cylinders and connected chamber 12 of the control valve device is vented to the atmosphere as hereinbefore described. If the supply of fluid under pressure to the brake pipe 11 is closed off by lapping the brake valve in the usual manner, the auxiliary reservoir pressure continues to build up from the maintaining reservoir 59, and when the auxiliary reservoir pressure in valve chamber 41 is slightly greater than brake pipe pressure present in the piston chamber 37, the triple valve piston 38 is caused to move upwardly, closing off the flow of fluid under pressure through the feed groove 58. As the piston thus moves, the auxiliary slide valve 40 is moved with it, relative to the main slide valve 39, and covers the port 66 in the main slide valve 39, thus closing off the further supply of fluid under pressure to the valve chamber 41.

Now, when the brake cylinder pressure, present in chamber 12 of the control valve device, acting on the large diaphragm 17, has been reduced sufficiently to balance the pressure of fluid in chamber 35 acting on the upper side of the smaller diaphragm 16, the pressure of fluid in chamber 24 acting on the underside of the diaphragm 18, causes the control valve device to operate to lap position in which the further discharge of fluid under pressure from the chamber 12 is closed off, thus maintaining the desired brake cylinder pressure.

When the pressure of fluid in the load cylinder 8 is sufficient to maintain the valve 52 unseated and the valve 54 seated, the quick service chamber 78 is connected to both the empty brake cylinder 7 and the load brake cylinder 8 when the triple valve device 2 is moved to release or release lap position, thus maintaining the pressure of fluid in the chamber 78 at brake cylinder pressure. It will thus be seen that if, in a train equipped with my invention, an application of the brakes should be initiated after a partial release thereof, the reduction in brake pipe pressure, into the quick service chambers will be less than if these chambers were completely vented, so that after a triple valve device 2 at the front end of a train has moved to service position the quick serial action of the triple valve devices 2 on the other cars of the train will be retarded to an extent dependent upon the pressures of fluid in the chambers 78. By retarding the quick serial action of the triple valve devices, it is obvious that a more gradual build up in brake cylinder pressure is obtained than if they were permitted to immediately move to service position as they would do if the chambers 78 were completely vented and fluid under pressure vented from the brake pipe to these chambers, thus ensuring the proper braking action throughout the train, especially when a train is being operated down a grade and cycling of the brakes is practiced.

When an emergency application of the brakes is initiated by a sudden reduction in brake pipe pressure, the triple valve piston 38 is shifted to its uppermost or emergency position as shown in Fig. 5, with a consequent movement of the slide valves 39 and 40. When the slide valve 39 is thus moved, the end thereof uncovers the passage 65 leading to the seat of the slide valve 13 of the control valve device 1. With the slide valve 39 in emergency position, fluid under pressure in the chamber 35 of the control valve device will be vented to atmosphere by way of passage 67, cavity 83 in the slide valve 39 of the triple valve device and atmospheric passage 84. With the chamber 35 thus vented, the pressure therein will reduce rapidly and the control valve device will move upwardly to its uppermost position as shown in Fig. 4, in which the slide valve 13 will lap the atmospheric passage 72 and uncover the passage 65 so that fluid under pressure from the slide valve chamber 41 in the triple valve device to the valve chamber 12 in the control valve device by way of passage 65 and from the chamber 12 to the brake cylinders 7 and 8 through passage 73 in the manner hereinbefore described in connection with the service application.

When operating empty cars, it is desirable, for well known reasons, to render the load brake cylinder inoperative, and for this purpose the change-over valve 6 is provided. To cut out the load cylinder 8, the valve 6 is rotated to a position in which the passage 75 is out of registration with the passages 74 and 76, thus closing communication of the load brake cylinder with the passage 81 and rendering the load brake cylinder inoperative. With the valve 6 in this position the passage 82 will be out of registration with the passages 73 and 81, thus closing off the flow of fluid to the empty brake cylinder 7 through the passage 82. However, when the valve is thus operated, a restricted passage 95 in the valve is brought into registration with the passages 73 and 81, so that in effecting an application of the brakes, fluid under pressure will flow from passage 81 to the empty brake cylinder 7 by way of the quick inshot valve chamber 86, past the unseated quick inshot valve 4 and its fluted stem and passage and pipe 73. Now when the pressure of fluid supplied through the passage 87 and acting on the inner seated area of the valve piston 51 is sufficient to overcome the pressure of the spring 57, the valve piston will be caused to move downwardly to its lowermost position, permitting the quick inshot valve 4 to seat, so that the further supply of fluid under pressure to the empty brake cylinder will be by the way of the restricted passage 95 in the change-over valve and passage and pipe 73.

It will be noted that the quick inshot valve 4 will remain unseated and permit unrestricted flow of fluid under pressure to the empty brake cylinder 7 until such time as the brake shoes (not shown) have engaged the usual car wheels, at which time the valve 4 seats and fluid is supplied to the empty brake cylinder at a restricted rate governed by the size of the choked passage 95.

The passage 95 is restricted to such an extent that it will require substantially the same time period to effect an application of the brakes with the empty brake cylinder alone as it requires to effect an application with both brake cylinders.

If at any time the control reservoir pressure present in the chamber 24 in the control valve device should be reduced by leakage, the pressure of the springs 34 of the control valve device will cause the follower member 31, diaphragm 19 and follower member 25 to move upwardly, so that the follower head 26 of the member 25 engages the underside of the diaphragm 18 and prevents the unintentional operation of the control valve 13. It will thus be seen that the pressure of the springs will compensate for the loss of fluid under pressure from the chamber 24.

If when the brakes are applied there should be a leakage of fluid under pressure from the brake cylinders, the diaphragms 16, 17 and 18 of the control valve device are so proportioned that they will operate to move the slide valve 13 to its uppermost position, in which the slide valve 13 uncovers the passage 65 and permits fluid under pressure to flow from the maintaining reservoir to the brake cylinders by way of chamber 12 and passage 23 until such time as the brake cylinder pressure is again built up in the chamber 12, at which time the control valve device 13 is caused to move to its middle or lap position as hereinbefore described, thus the brake cylinder pressure will be maintained against such leakage.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake cylinder and an auxiliary reservoir, of valve means subject to the pressures of the brake cylinder, auxiliary reservoir and a pressure chamber for controlling the brakes, and means operative to compensate for loss of pressure in said chamber.

2. The combination with a brake cylinder and an auxiliary reservoir, of valve means subject to the pressures of the brake cylinder, auxiliary reservoir and a pressure chamber for controlling the brakes, and spring means operative to compensate for loss of pressure in said chamber.

3. The combination with a brake cylinder and an auxiliary reservoir, of valve means subject to the pressures of the brake cylinder, auxiliary reservoir and a pressure chamber for controlling the brakes, means operative to compensate for loss of pressure in said chamber, and a triple valve device operative to control the operation of said valve means.

4. The combination with a brake cylinder, a brake pipe, and an auxiliary reservoir, of valve means subject to the pressures of the brake cylinder, auxiliary reservoir and a pressure chamber for maintaining the pressure of fluid in said brake cylinder, means operative to compensate for loss of pressure in said chamber, and a triple valve device subject to variations in brake pipe pressure for controlling the operation of said valve means.

5. The combination with a brake cylinder, an auxiliary reservoir, and a control reservoir, of a brake cylinder pressure maintaining valve device comprising a valve for controlling the supply of fluid under pressure to the brake cylinder, and movable abutments subject to the pressure of fluid in the control reservoir and to variations in the pressures of fluid in the brake cylinder and auxiliary reservoir for operating said valve, and means operative to compensate for loss of pressure in said control reservoir.

6. A fluid pressure brake apparatus comprising a brake pipe, a brake cylinder, an auxiliary reservoir, a maintaining reservoir, a control valve device having a chamber subject to auxiliary reservoir pressure for controlling the supply of fluid under pressure from said maintaining reservoir to said brake cylinder to compensate for leakage of fluid under pressure from the brake cylinder, and a triple valve device operative to emergency position upon a sudden reduction in brake pipe pressure for supplying fluid under pressure from said auxiliary reservoir to said brake cylinder and for venting fluid under pressure from said chamber to cause said control valve device to operate to also supply fluid under pressure to said brake cylinder.

7. A fluid pressure brake apparatus comprising a brake pipe, a brake cylinder, an auxiliary reservoir, a maintaining reservoir normally charged with fluid under pressure from said brake pipe, a control valve device having a chamber normally charged with fluid under pressure from said auxiliary reservoir and operative upon a reduction in the pressure of fluid in said chamber due to leakage of fluid under pressure from the brake cylinder for establishing communication from said maintaining reservoir to the brake cylinder, and a triple valve device operative to emergency position upon a sudden reduction in brake pipe pressure for supplying fluid under pressure from the auxiliary reservoir to said brake cylinder and for venting fluid under pressure from said chamber.

8. The combination with a brake cylinder, a brake pipe, a maintaining reservoir, and an auxiliary reservoir, of valve means subject to the pressures of the brake cylinder, auxiliary reservoir and a pressure chamber for controlling communication from said maintaining reservoir to said brake cylinder and operative upon a reduction in auxiliary reservoir pressure due to leakage of fluid from the brake cylinder for supplying fluid under pressure from said maintaining reservoir to the brake cylinder to compensate for for such leakage, and a triple valve device operative to emergency position upon a sudden reduction in brake pipe pressure, said triple valve device when in emergency position being adapted to supply fluid under pressure from said auxiliary reservoir to said brake cylinder and to vent the auxiliary reservoir pressure acting one said valve means for causing said valve means to operate to establish communication from said maintaining reservoir to said brake cylinder.

9. A fluid pressure brake apparatus comprising a brake pipe, a brake cylinder, an auxiliary reservoir and a maintaining reservoir normally charged with fluid under pressure from said brake pipe, a control valve device having a chamber normally charged with fluid under pressure and normally maintaining communication of said maintaining reservoir with said brake cylinder closed and operative upon the leakage of fluid under pressure from the brake cylinder for opening communication to supply fluid under pressure from said maintaining reservoir to the brake cylinder, and valve means operative upon emergency reduction in brake pipe pressure for supplying fluid under pressure from said auxiliary reservoir to said brake cylinder and for venting fluid under pressure from said chamber for causing said control valve device to operate to establish communication through which fluid under pressure from said maintaining reservoir is supplied to the brake cylinder.

In testimony whereof I have hereunto set my hand, this 26 day of February 1929.

CLYDE C. FARMER.